(12) United States Patent
White et al.

(10) Patent No.: US 7,959,846 B2
(45) Date of Patent: Jun. 14, 2011

(54) METHOD OF MOULDING A HINGE

(75) Inventors: Paul White, Luton (GB); Keith Sydney Levett, Buckingham (GB)

(73) Assignee: TRW Systems Ltd., Solihull (GB)

( * ) Notice: Subject to any disclaimer, the term of this patent is extended or adjusted under 35 U.S.C. 154(b) by 926 days.

(21) Appl. No.: 10/568,174

(22) PCT Filed: Aug. 13, 2004

(86) PCT No.: PCT/GB2004/003506
§ 371 (c)(1),
(2), (4) Date: Feb. 2, 2007

(87) PCT Pub. No.: WO2005/016621
PCT Pub. Date: Feb. 24, 2005

(65) Prior Publication Data
US 2007/0228603 A1 Oct. 4, 2007

(30) Foreign Application Priority Data
Aug. 15, 2003 (GB) .................................. 0319240.8

(51) Int. Cl.
| | |
|---|---|
| B29B 17/00 | (2006.01) |
| B29B 7/00 | (2006.01) |
| B29C 71/00 | (2006.01) |
| B29C 45/14 | (2006.01) |
| B29C 45/00 | (2006.01) |
| E05D 7/00 | (2006.01) |

(52) U.S. Cl. ................. 264/342 R; 264/242; 264/328.1; 264/328.8; 16/221

(58) Field of Classification Search ........................ None
See application file for complete search history.

(56) References Cited

U.S. PATENT DOCUMENTS

| | | | | |
|---|---|---|---|---|
| 2,342,477 | A | * | 2/1944 | Magnenat ..................... 220/835 |
| 3,000,049 | A | | 9/1961 | Terry |
| 5,298,215 | A | | 3/1994 | Krause |
| 5,395,161 | A | | 3/1995 | Spykerman et al. |

FOREIGN PATENT DOCUMENTS

| | | |
|---|---|---|
| EP | 0 904 917 B1 | 6/2003 |
| FR | 2 752 541 A1 | 2/1998 |

* cited by examiner

*Primary Examiner* — Christina Johnson
*Assistant Examiner* — Benjamin Schiffman
(74) *Attorney, Agent, or Firm* — Fay Sharpe LLP

(57) ABSTRACT

The present invention is concerned with a hinge (50) and a method of molding the hinge. The hinge comprises: a first part (52) and a second part (54) connected together during moulding to allow relative pivotal movement between the parts. The second part is molded over the first part after molding of the first part to form an interface (68) between the second part and the first part at which relative pivotal movement is allowed. After moulding of the second part the second part shrinks in a controlled manner to provide a predetermined frictional force at the interface between the first part and the second part in order to resist said relative pivotal movement.

12 Claims, 3 Drawing Sheets

METHOD OF MOULDING A HINGE

The present invention relates to a hinge comprising two moulded parts, which are pivotal relative to each other, and to a method of moulding the same.

A hinge is known hereto which comprises a first part that is moulded in a first mould, and a second part that is moulded in a second mould. After moulding, the parts are connected together to allow relative pivotal movement between the parts. Accurately moulding the two parts so that they fit together at an interface between the parts requires low tolerance levels during moulding and, as is well known in the art, low tolerance levels result in increased expense. Furthermore, it is difficult to fit the two parts together in such a way that predetermined frictional force at the interface between the parts causes a controlled resistance to relative pivotal movement.

An object of the invention is to provide an improved hinge and method of manufacturing the same.

The present invention provides a hinge comprising a first part and a second part connected together during moulding to allow relative pivotal movement between the parts, wherein the second part is moulded over the first part after moulding of the first part to form an interface between the second part and the first part at which said relative pivotal movement is allowed, and after moulding of the second part the second part shrinks in a controlled manner to provide a predetermined frictional force at the interface between the first part and the second part in order to resist said relative pivotal movement.

The present invention also provides a method of moulding a two part hinge comprising a first moulded part and a second moulded part connected together during moulding to allow relative pivotal movement between the parts, the method comprising:

moulding the first part;

moulding the second part over the first part after moulding of the first part to form an interface between the second part and the first part at which said relative pivotal movement is allowed; and after moulding of the second part, allowing the second part to shrink in a controlled manner to provide a predetermined frictional force at the interface between the first part and the second part in order to resist said relative pivotal movement.

Other preferred aspects of the invention are defined in the accompanying claims.

In order that the present invention may be well understood, an embodiment thereof, will now be described, by way of example only, with reference to the accompanying drawings, in which.

Figure 1:
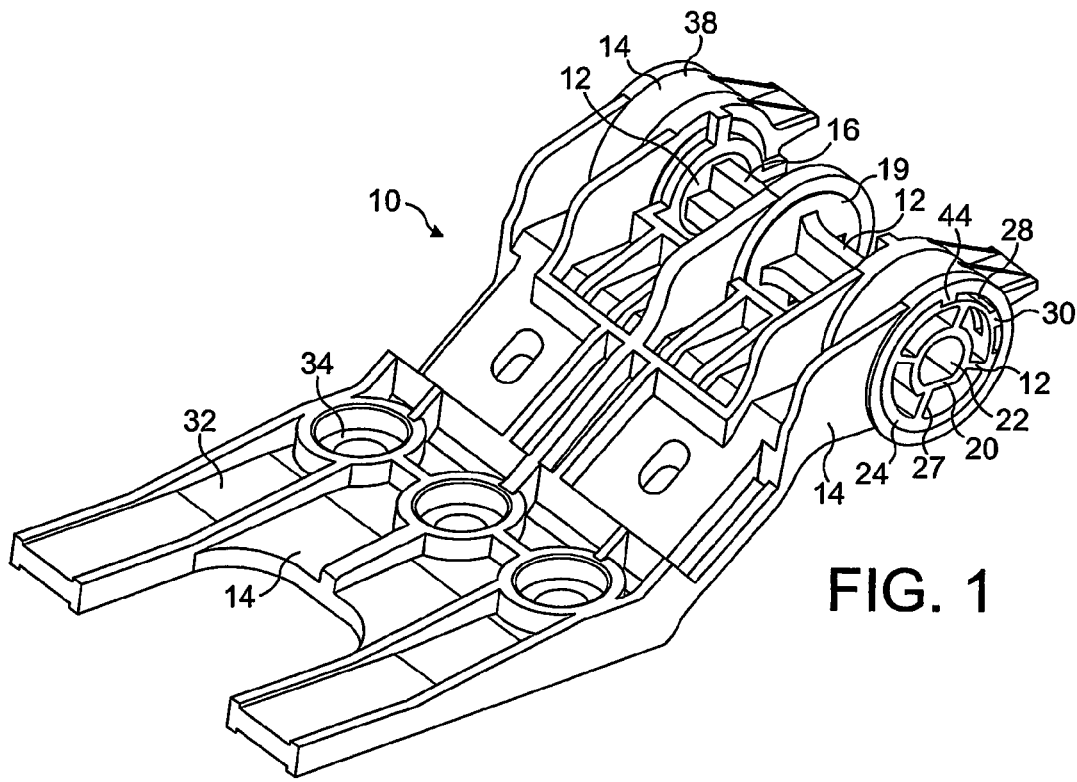
FIG. 1 is a perspective view of a hinge.
Figure 2:
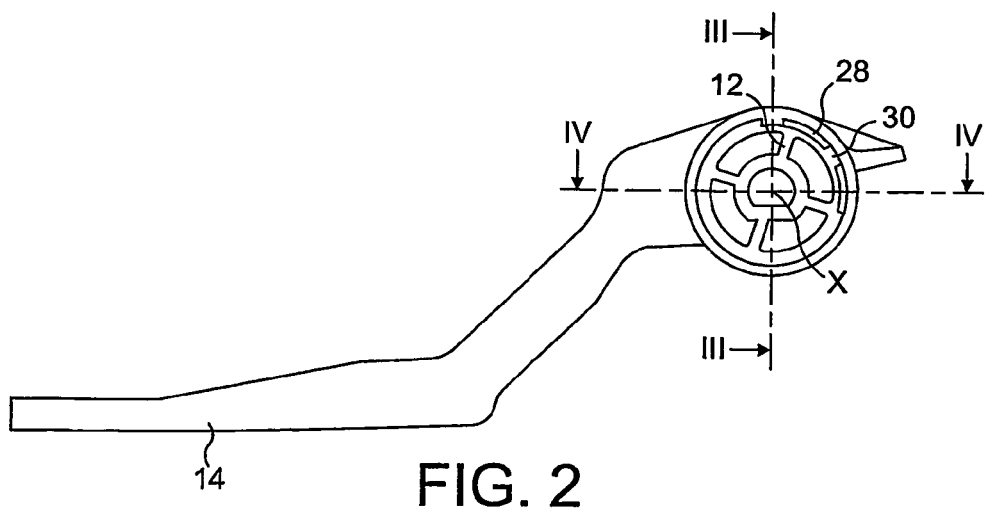
FIG. 2 is a side view of the hinge shown in FIG. 1.
Figure 3:
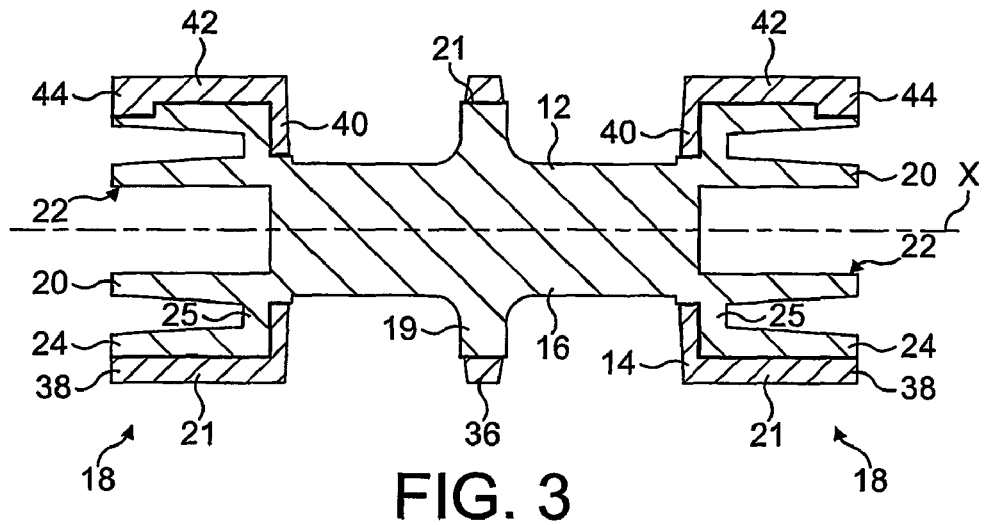
FIG. 3 is a cross-section of the hinge taken along line III-III in FIG. 2.
Figure 4:
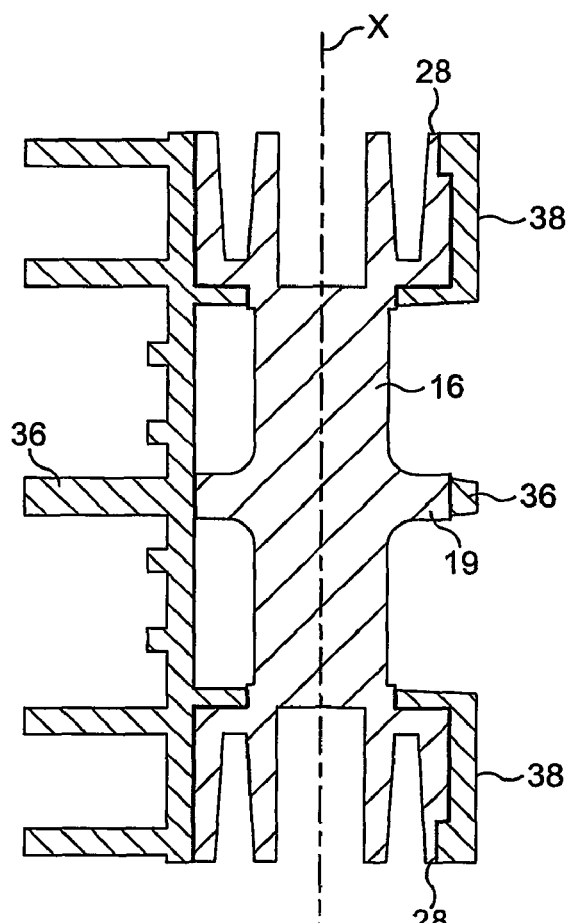
FIG. 4 is a cross-section of the hinge taken along line IV-IV.

Referring to the FIGS. 1 to 4, a hinge 10 is shown which comprises a first moulded part 12 and a second moulded part 14. The first part 12 and the second part 14 are connected together during moulding of the parts to allow relative pivotal movement between the parts.

In the example shown, the first part 12 is a bearing part having a generally uniform solid cruciform central portion 16, respective lateral portions 18 and a central axis X. Extending radially from central portion 16 is a circumferential ridge 19 having an outer circumferential surface, which after moulding forms part of an interface 21 (shown in the drawings as a thick black line) between the first part 12 and the second part 14 at which relative pivotal movement is allowed. Lateral portions 18 each have a central hub 20 defining a closed bore 22. Closed bore 22 is for engaging with a shaft (not shown) to fix the bearing member relative to the pivotal axis X and may be of any suitable shape, although as shown, the closed bore 22 is a D-shape. Lateral portions 18 have respective generally cylindrical hollow portions 24 that are connected to central portion 16 by respective radially extending annular portions 25. The hollow portions 24, and radially extending portions have an annular surface which, when moulded, forms part of the interface 21 (shown in thick black lines) between the first part 12 and the second part 14. The hub 20 and the cylindrical portions 24 are connected by radially extending strengthening ribs 27. The hollow portions 24 have respective recesses 28 which are spaced from the inner surface of the second part 14 after moulding. Recesses 28 extend over part of the circumferential extent of the hollow portions 24 (about 100° as shown) and form part of limiting means (described in greater detail below) for limiting the extent of relative pivotal movement between parts 12 and 14. Extending radially outwardly from recesses 28 are respective projections 30 which form part of detent means (also described in greater detail below) for resisting movement of the parts 12 and 14 away from a predetermined relative orientation.

In the example shown, the second part 14 is a supporting part for supporting a member hinged about axis X. The supporting part is specifically adapted to support and be fixed to an armrest assembly in an automobile. Alternatively, the supporting part may support any suitable member to be hinged about an axis, for instance, a door or a compartment. One of the advantages of the example described is that the hinge is structurally stable and resists loading transverse to the axis, and therefore the hinge is particularly suitable for those applications where significant abuse loadings may be encountered.

The supporting part in FIG. 1 has a flanged portion 32 for supporting an armrest in an automobile. Three holes 34 are formed in the flanged portion for receiving fastening elements for fastening the supporting part to other components of the armrest assembly.

The second, or supporting, part 14 has three hollow generally cylindrical portions 36, 38 that are moulded over the first part 12 and which are connected to flange portion 32. The central hollow portion 36 has an inner circumferential surface, which is moulded over the outer circumferential surface of ridge 19 to form part of the interface 21 between the first part 12 and the second part 14. Lateral cylindrical portions 38 are moulded over the annular surface of the lateral portions 18 also to form part of the interface 21. Lateral portions 38 are moulded with respective radially extending portions 40 and respective cylindrical portions 42. The radially extending portions 40 co-operate with radially extending portions 25 of the first part 12 for preventing relative axial movement between the first part 12 and the second part 14. The cylindrical portions 42 have respective projections 44 that move within recess 28 of the first part 12 to limit relative pivotal movement between two limits of travel at the ends of the recess, and which co-operate with projection 30 to form the detent means. In more detail, the projection 44 can ride over projection 30 by deformation of projections 30 and 44 during pivotal movement of the parts 12 and 14. Such deformation is achieved only with increased torque, which resists pivotal movement away from one limit of travel of the parts 12 and 14. The detent means resists relative movement of the parts out of a first relative orientation, which in the example shown, serves to resist movement of the armrest out of an upright orientation.

In the example shown, the interface 21 is annular so that the predetermined frictional force resisting relative pivotal movement is constant over the extent of the pivotal movement. Alternatively, the interface can be of any suitable shape so that the predetermined frictional force changes in a controlled manner over the extent of the pivotal movement. For instance, the interface could be elliptical so that more resistance to movement is provided towards one of the limits of travel. With such an elliptical form, as an outer part rotates around an inner part, the pressure increases between the parts at the interface. As the surface area remains constant, the normal force between the surfaces increases, thereby increasing frictional force.

Moulding of the hinge will now be described.

Plastics material is injected into a mould for the first part 12 and the first part is allowed to cool. The thermal properties of the plastics material are known and therefore shrinkage of the first part during the transition between a moulding temperature and a cooled temperature can be accurately determined The first part 12 is introduced to a second mould for the second part 14, the first part 12 forming at least part of the mould for the second part 14. In this regard, the annular surfaces of the first part 12, which when moulded form the interface 21, form part of the mould for the second part 14. The plastics material selected for the first part 12 must be resistant to the heat of the hot plastics material of the second part 14 when it is injected over the first part 12.

Plastics material is injected into the second mould so that the second part 14 is moulded over the first part 12 and the parts contact at each at the interface 21. The plastics material for the second part 14 may be the same as the plastics material of the first part or a different material as required. The thermal behaviour of the second plastics material is known so that after moulding the amount of shrinkage of the second part 14 between a moulding temperature and an ambient temperature can be determined. The control of shrinkage allows control of the amount of tightening of the second part about the first part which in turn controls the amount of force normal to the interface 21 and thereby the frictional force which resists relative pivotal movement between the parts.

The material of the second part 14 can be injected before the first part 12 has completed shrinkage after moulding. Accordingly, the first part 12 undergoes shrinkage during moulding of the second part 14. Therefore shrinkage of the first part 12 and the second part 14 control the force normal to the interface 21 and therefore two characteristics are controllable for determining the predetermined fictional force at the interface, allowing greater control of the moulding process.

Frictional force at the interface 21 resists pivotal movement of the parts 12 and 14. The friction at the interface is determined by the coefficient of friction between the two parts at the interface and the force normal to the interface.

The method of moulding the second part 14 about the first part 12 allows a controlled or predetermined frictional force to be produced at the interface 21 between the two parts. In the prior art, as described above, manufacturing tolerances have to be low to produce an assembly with appropriate frictional force. The parts, according to the prior art, also have to be assembled together after moulding, and it is difficult to assemble the parts together after moulding to produce a predetermined frictional force. According to the present method of moulding a hinge, the parts are connected together during moulding and an appropriate frictional force produced without the requirement for low manufacturing tolerances. Accordingly, the present hinge can be made with less expense and greater operational reliability.

As will be appreciated from the foregoing description, the two parts 12 and 14 fit together so that there is a uniformly formed contact surface between the parts. Accordingly, there is no appreciable play between the parts after moulding which reduces any undesirable movement between the parts transverse to the axis X. The uniform contact surface therefore resists abuse loadings applied to the hinge transverse to, parallel with and about the axis.

In a modification of the hinge and the method of moulding the hinge, the material of the second part is injected into a mould in which the first part forms a moulding surface. The moulding surface of the first part is deformed by the second part during moulding of the second part. In other words, the first part is deformed at the interface between the parts. When moulding is complete, the resilience of the first part causes it to engage with the second part, and to apply a resilient force normal thereto at the interface between the parts. Shrinkage of said second part is limited by the resilience of said first part and the resilience of said first part and said second part at an equilibrium condition after moulding is complete controls said predetermined frictional force. This modified method provides an additional characteristic which can be varied to control the normal force at the interface between the parts and hence allow greater control of the frictional force which resists relative pivotal movement between the parts at the interface.

Figure 5:
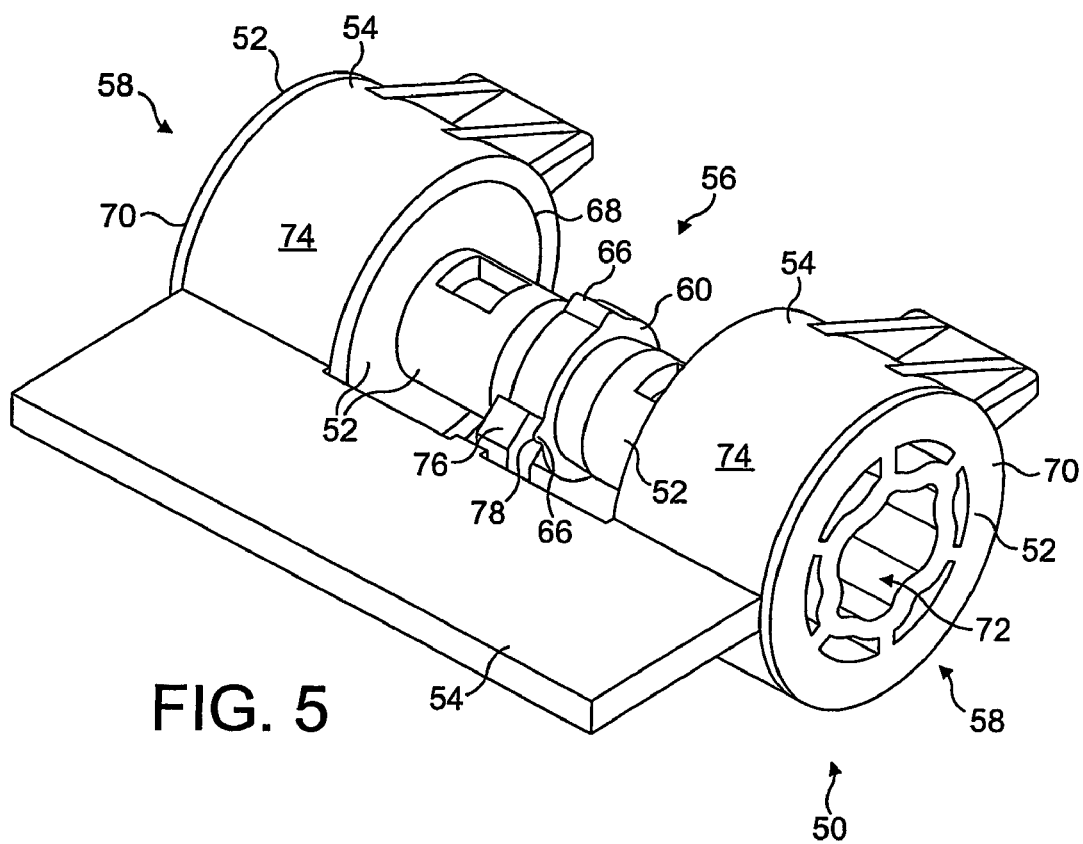
FIG. 5 is a perspective view of a hinge according to a currently preferred embodiment of the invention.

FIG. 5 is a perspective view of a currently preferred embodiment of the invention. In FIG. 5, a hinge 50 is shown which comprises a first moulded part 52 and a second moulded part 54. The first part 52 and the second part 54 are connected together during moulding of the parts to allow relative pivotal movement between the parts. The following description focuses on the differences between the hinge 50 and the hinge 10, discussion of similarities between the two embodiments being omitted for brevity.

The first part 52 comprises a generally cylindrical central portion 56 and respective lateral portions 58. In the first embodiment, the central portion 16 of the first part 12 has a circumferential ridge 19 having a bearing surface forming part of the interface 21 between the first and the second parts 12, 14. In the present embodiment, the central portion 56 does not form a bearing surface but instead forms part of a detent means. In more detail, a circumferential ridge 60 extends radially outwardly from the central portion 56. Respective projections, or teeth, 66 extend radially outwardly from ridge 60 and are spaced apart by about 90 degrees.

Lateral portions 58 of the first part 52 form respective annular bearing surfaces, which form part of an interface 68 between parts 52 and 54. Lateral portions 58 have respective end rims 70 for preventing relative axial movement between the parts 52 and 54. Respective closed bores 72 are formed in the lateral portions 58 which engage with a shaft (not shown) for preventing pivotal movement of part 52 relative to the shaft. As shown, closed bores 72 have a splined inner surface for engaging with a complimentary shaped shaft outer surface.

At each lateral side of the second part 54, two hollow generally cylindrical portions 74 are moulded over respective annular bearing surfaces of the first part 52 so that a predetermined frictional force is provided at the interface 68 between the first part 52 and the second part 54 in order to resist relative pivotal movement between the parts.

The detent means of the two parts will now be described in greater detail. Part 54 has a pawl 76 with a recess 78 which is resiliently biased to engage with the teeth 66 of the ridge 60 to resist relative pivotal movement between the first part 52 and the second part 54. When the two parts are in a first relative orientation, the recess is engaged with a first tooth 66 and when the two parts are in a second relative orientation, the recess is engaged with a second tooth 66. If the hinge 50 forms part of an armrest assembly, the first relative orientation constitutes a horizontal position of the assembly and the second relative orientation constitutes a vertical position of the assembly. Relative pivotal movement between the parts is achieved when the torque applied to part 54 is sufficient to overcome the biasing force of the pawl 76 to allow an engaged tooth 66 to disengage from the recess 78. When a first tooth has disengaged from the recess, relative pivotal movement between the parts 52 and 54 causes the pawl to travel along ridge 60 until the recess engages with the second tooth 66. The resilience of the pawl is selected so that no significant friction arises between pawl 76 and ridge 60 so that the resistance to relative pivotal movement between the parts 52, 54 is determined by the frictional force at interface 68.

The omission of a central bearing surface in hinge 50 facilitates the moulding process, since control of the frictional force at the interface 68 is determined by the two lateral portions only. The lateral portions 74 are equal in size, and surface area and therefore undergo the same shrinkage after moulding and apply the same normal force at the interface 68.

The invention claimed is:

1. A method of molding a two part hinge comprising a first molded part and a second molded part connected together during molding to allow relative pivotal movement between the parts, the method comprising:
    molding the first part and allowing the first part to shrink during the transition between a molding temperature and a cooling temperature;
    introducing the first part into a mold for the second part; and
    molding the second part over the first part to form an interface between the second part and the first part at which said relative pivotal movement is allowed,
    wherein said molding of the second part comprises selecting a timing for injecting the material of the second part before the first part has completed shrinkage after molding so that the first part undergoes shrinkage during molding of the second part in order to provide a predetermined frictional force at the interface between the first part and the second part in order to resist said relative pivotal movement; and,
    injecting a material of the second part at said selected timing.

2. A method as claimed in claim 1, wherein the predetermined frictional force is generally constant over the extent of said relative pivotal movement.

3. A method as claimed in claim 2, wherein the interface is annular.

4. A method as claimed in claim 1, wherein the interface is shaped during moulding so that said predetermined frictional force changes in a controlled manner over the extent of said relative pivotal movement.

5. A method as claimed in claim 4, wherein said interface is elliptical.

6. A method as claimed in claim 1, wherein said first part is resilient after moulding and is deformed at the interface during moulding and/or shrinkage of said second part, the resilience of said first part affecting the frictional force at said interface.

7. A method as claimed in claim 1, wherein shrinkage of said second part is limited by the resilience of said first part, and the resilience of said first part and said second part at an equilibrium condition after moulding is complete controls said predetermined frictional force.

8. A method as claimed in claim 1, wherein the first part and the second part are moulded with limiting means for limiting the extent of said relative pivotal movements between two limits of travel.

9. A method as claimed in claim 1, wherein the first and the second parts are moulded with detent means operable to resist said relative pivotal movement out of at least a first relative orientation of the first and the second parts.

10. A method as claimed in claim 1, wherein said first part is a bearing member fixable relative to a pivotal axis and said second part is a supporting member allowed to pivot about said axis.

11. A method as claimed in claim 1, further comprising:
    determining a shrinkage of said first part between a first moulding temperature and a first cooling temperature; and
    determining a shrinkage of said second part between a second moulding temperature and a second cooling temperature,
    wherein said selection of said timing for injecting said material of said second part is based on said determined shrinkage of said first part and said determined shrinkage of said second part.

12. A method of molding a two part hinge comprising a first molded part and a second molded part connected together during molding to allow relative pivotal movement between the parts, the method comprising:
    molding a first part at a first molding temperature;
    cooling the first part to a temperature above ambient temperature for a first period, the cooling causing at least partial shrinkage of the first part;
    introducing the first part into a mould for a second part;
    injecting the mould with a material at a second molding temperature;
    continued shrinking of the first part simultaneous to molding of the second part over the first part; and,
    cooling the first and second parts to an ambient temperature for a second period until the first and second parts reach complete shrinkage,
    wherein the complete shrinkage of the second part is limited by a resilience of the first part, and the first period determines the resilience of the first part.

* * * * *